United States Patent Office 3,244,802
Patented Apr. 5, 1966

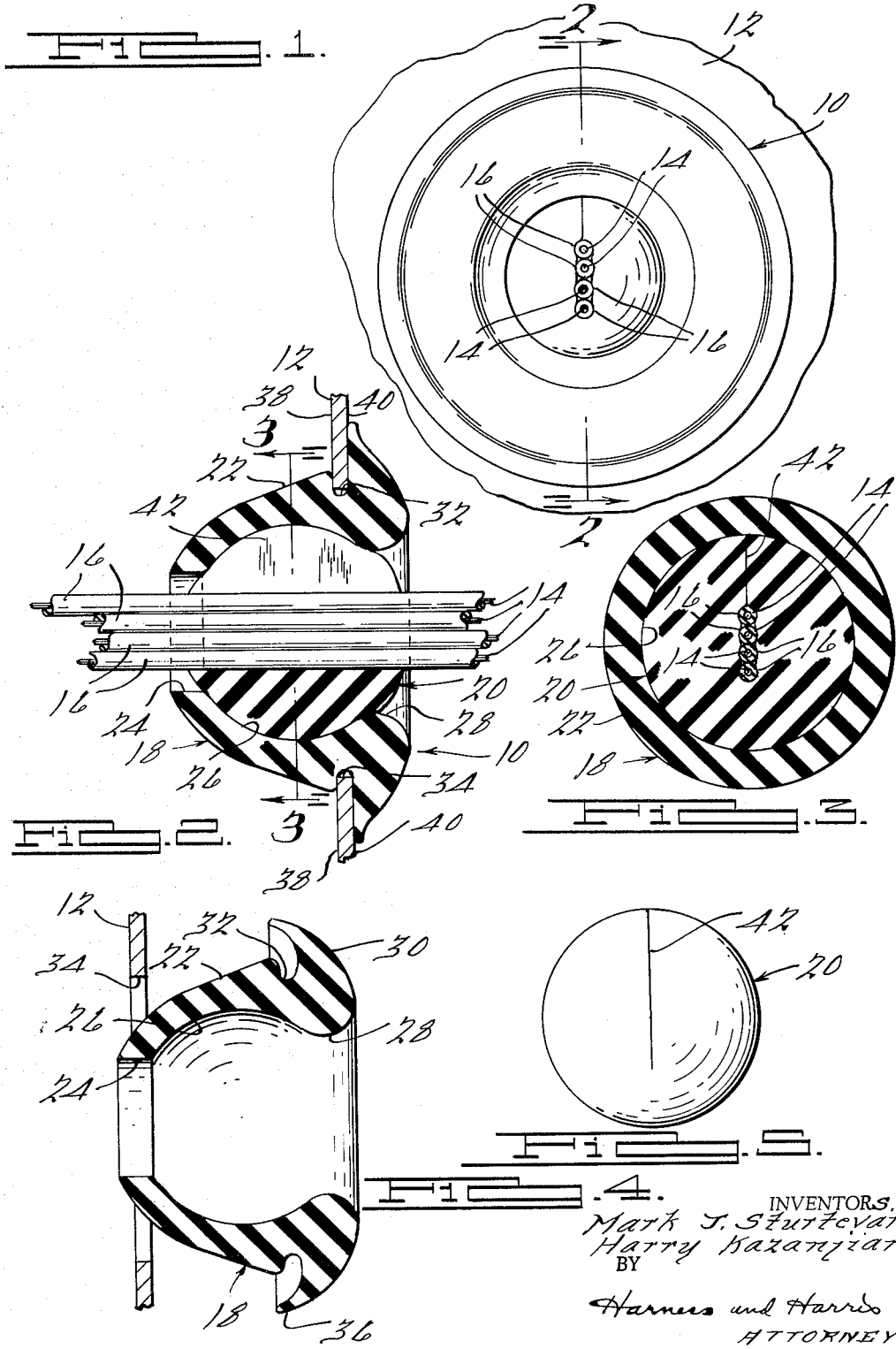

3,244,802
RESILIENT GROMMET AND SEAL ASSEMBLY
Mark J. Sturtevant, Grosse Pointe, and Harry Kazanjian, Detroit, Mich., assignors to Chrysler Corporation, Highland Park, Mich., a corporation of Delaware
Filed Feb. 20, 1964, Ser. No. 346,205
2 Claims. (Cl. 174—153)

This invention relates generally to the sealing of wire and more particularly to the sealing of wire which passes through a wall structure.

The firewall of a motor vehicle serves to separate the engine compartment from the passenger compartment and it is often necessary to have electrical conductors extend from the engine compartment through the firewall and into the passenger compartment.

In such situations it is necessary to provide sealing means, at such places where the electrical wire passes through the firewall, in order to effectively exclude such things as engine noise, water and engine fumes from the passenger compartment.

Accordingly it is an object of this invention to provide novel and improved sealing means for sealing about a wire where such wire passes through a wall structure.

Another object of this invention is to provide such sealing means which will accommodate either a single wire or a plurality of electrical wires.

Still another object of this invention is to provide wire sealing means which can be quickly installed.

Other objects and advantages of the invention will become apparent when reference is made to the following description and accompanying drawings wherein.

FIGURE 1 is a front elevational view of a sealing arrangement, constructed in accordance with the teachings of this invention, secured to a wall member;

FIGURE 2 is a cross-sectional view taken substantially on the plane of line 2—2 of FIGURE 1 and looking in the direction of the arrows;

FIGURE 3 is a cross-sectional view taken on the plane of line 3—3 of FIGURE 2; and FIGURES 4 and 5 are each elements which comprise the sealing arrangement of FIGURES 1–3 illustrated prior to assembly with each other.

Referring now in greater detail to the drawings, FIGURE 1 illustrates a sealing arrangement 10, in accordance with this invention, operatively secured to a panel or wall structure 12 which, in an automotive vehicle, may be a firewall. A plurality of electrical conductors 14 each having an insulating coating 16 are shown as extending through the panel 12 and seal arrangement 10.

The seal arrangement is essentially comprised of a grommet 18 and resilient ball 20 each illustrated in its free state in FIGURES 4 and 5, respectively. Grommet 18 is basically a body of revolution having its outer surface 22 tapering generally inwardly towards its central axis at one end thereof. An aperture 24 formed in said end communicates with a generally spherical chamber 26 which is also provided with an opening 28. The opening 28 is preferably formed so as to blend with a flange portion 30. An annular groove 32, formed generally between surface 22 and flange 30, is provided so as to retain panel 12 therebetween. That is, referring to FIGURES 4 and 2, as grommet 18 is pushed through panel aperture 34, surface 22 is caused to move radially inwardly until the edge of aperture 34 comes into substantial axial alignment with groove 32 at which time the deformed surface 22 will move radially outwardly assuming a position as illustrated in FIGURE 2.

As best seen in FIGURE 4, flange 30 is formed so as to have its cross-sectional thickness diminish generally radially outwardly of its central axis and is further formed so as to have its outer peripheral portion 36 in general axial alignment with groove 32. Consequently, when grommet 18 is pushed through aperture 34 to the position illustrated in FIGURE 2, portion 36 of flange 30 is resiliently deformed to assume a configuration as that shown in FIGURE 2. Since flange 30 experiences resilient deformation it continually creates a force against panel 12 and in so doing causes sealing to occur between surface 38 of panel 12 and one side of groove 32 and also between surface 40 of panel 12 and the other side of groove 32.

The resilient ball 20 is slit as indicated at 42 thereby enabling the electrical wires 14 to be received therethrough as illustrated generally in FIGURES 1, 2 and 3.

In assembling the sealing arrangement, the grommet 18 is secured to the panel 12, as illustrated, the electrical wires are drawn through apertures 24 and 28, and the ball 20, with wires 14 being contained within slit 42, is forced through aperture 28 until the ball seal 20 becomes seated within chamber 26. The outer diameter of ball seal 20 is slightly larger than the diameter of spherical chamber 26 so as to assure the closure of slit 42 about the wires 14.

Further, although not entirely necessary, it has nevertheless been found to be beneficial and desirable to apply appropriate soft filler-like sealing compounds within chamber 26 and/or slit 42 in order to assure perfect sealing upon assembly of the ball seal 20 to the grommet 18 especially in such instances wherein a large number of electrical wires are to pass through sealing ball 20.

Preferably, grommet 18 is molded from a relatively dense rubber while the ball 20 is made of relatively soft rubber. Further improved results are obtainable by having the sealing ball made of soft closed cell sponge rubber with the outer surface being cured and the core of the ball being left uncured.

The sealing arrangement 10 provides an effective means for allowing from one to a substantial plurality of wires to pass through a wall structure and still be in sealing engagement therewith. The arrangement 10 is particularly useful in the manufacture of automotive vehicles wherein a variation in the number of electrical wires will possibly exist as between any two vehicles.

The combination of the sealing ball 20 and the spherical chamber 26 provide a further benefit. That is, regardless of the position of the panel 12, ball 20 can be rotated, to a great extent, within grommet 18 so as to best accommodate the wires passing therethrough thereby minimizing any danger of the wires becoming pinched or severed as a consequence of extremely sharp bends.

Although the invention has been described primarily with reference to the sealing of electrical wires, it should be apparent that the invention is equally well suited and adapted to the sealing of sundry conduits, cables and other transmission means which must pass through a panel member.

Further, although only a preferred embodiment of the invention has been disclosed and described, it is apparent that other embodiments and modifications are possible within the scope of the appended claims.

We claim:
1. A sealing assembly for sealing a plurality of conductors passing through a bore in a wall, comprising a rubber grommet received in said bore, and a centrally disposed spherical sealing member retained by said grommet, said grommet comprising a body of revolution having an outer surface thereof tapering generally inwardly toward the axis of revolution at one end thereof, a first aperture formed in said one end, a second aperture formed in said body at another end opposite to said one end, a continuous annular flange of generally arcuate cross section formed about said other end and radiating thereabout, an annular groove formed in said body and being located axially thereof so as to have the radially outer-most portion of said flange in radial juxtaposition therewith, said groove being provided in order to receive a peripheral edge of said wall defining said bore, said radially outermost portion of said flange being effective to abut against said wall and create a force thereagainst in order to cause sealing to occur between said groove and said wall and between said flange and said wall, a generally spherical chamber formed in said body and communicating with said first and second apertures, said spherical wire sealing member being formed of relatively soft rubber and being partially slit so as to receive said conductors therethrough, and said spherical sealing member having an outer diameter larger than the diameter of said chamber, said spherical sealing member being effective when inserted into said chamber to contain said conductors within said slit in a manner causing said conductors to be in a side-by-side relationship and thereby generally enveloping and sealing said conductors, said groove and said chamber being so located with respect to each other as to cause said chamber and said spherical sealing member to extend a substantial distance through said bore defined by said peripheral edge of said wall.

2. A sealing assembly for sealing a plurality of conductors passing through a bore in a wall, comprising a grommet of resilient material received in said bore, and a centrally disposed spherical resilient sealing member retained by said grommet, said grommet comprising a body of revolution having a continuous annular groove formed in the outer surface thereof so as to generally define first and second body portions at axially opposite sides of said groove, said first body portion having an outer surface thereof tapering from a maximum outer diameter generally inwardly toward the axis of revolution at one end of said body, a first aperture formed in said one end, a second aperture formed in said body at another end opposite to said one end, a continuous annular flange of generally arcuate cross section when viewed in a plane passing through and containing said axis of revolution formed about said other end and radiating thereabout the radially outermost portion of said flange being of a diameter substantially greater than the said maximum outer diameter and being positioned in its free state so as to be in generally radial juxtaposition to said annular groove, said groove being provided in order to receive a peripheral edge of said wall defining said bore, said radially outer-most position of said flange being effective to abut against said wall and resiliently create an axially directed force thereagainst in order to cause sealing to occur between said groove and said wall and between said flange and said wall, a generally spherical chamber formed in said body and communicating with said first and second apartures, said resilient spherical sealing member being partially slit so as to receive said conductors therein, and said spherical wire sealing member having an outer diameter larger than the diameter of said chamber, said spherical sealing member being effective when inserted into said chamber to contain said conductors within said slit thereby generally enveloping and sealing said conductors within said grommet, said groove and said chamber being so located with respect to each other as to cause said chamber and said spherical sealing member to extend a substantial distance through said bore defined by said peripheral edge of said wall.

References Cited by the Examiner
UNITED STATES PATENTS

| | | | |
|---|---|---|---|
| 2,404,539 | 7/1946 | Schmidt | 285—192 |
| 2,517,693 | 8/1950 | Mead et al. | |
| 2,717,792 | 9/1955 | Pelley. | |
| 2,922,836 | 1/1960 | Brown | 174—153 |

ROBERT K. SCHAEFER, *Primary Examiner.*

L. E. ASKIN, *Examiner.*